US010948605B2

(12) United States Patent
Rezaei et al.

(10) Patent No.: US 10,948,605 B2
(45) Date of Patent: Mar. 16, 2021

(54) BROADCAST AND UTILIZATION OF PRECISE GNSS CORRECTION DATA

(71) Applicant: Valeo North America, Inc., Troy, MI (US)

(72) Inventors: Shahram Rezaei, Troy, MI (US); Andrew Peter Draper, Troy, MI (US)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 258 days.

(21) Appl. No.: 15/850,195

(22) Filed: Dec. 21, 2017

(65) Prior Publication Data

US 2019/0196022 A1    Jun. 27, 2019

(51) Int. Cl.
| | |
|---|---|
| G01S 19/41 | (2010.01) |
| G01S 19/07 | (2010.01) |
| G01S 19/44 | (2010.01) |
| G01S 19/42 | (2010.01) |
| G01S 19/43 | (2010.01) |
| H04L 29/08 | (2006.01) |

(52) U.S. Cl.
CPC .............. *G01S 19/41* (2013.01); *G01S 19/07* (2013.01); *G01S 19/071* (2019.08); *G01S 19/426* (2013.01); *G01S 19/43* (2013.01); *G01S 19/44* (2013.01); *H04L 67/12* (2013.01)

(58) Field of Classification Search
CPC ........ G01S 19/41; G01S 19/07; G01S 19/426; G01S 19/43; G01S 19/44; H04L 67/12
USPC ...................................................... 342/357.2
See application file for complete search history.

(56) References Cited

U.S. PATENT DOCUMENTS

| | | | |
|---|---|---|---|
| 9,557,422 B1 | 1/2017 | Miller et al. | |
| 10,324,195 B2* | 6/2019 | Garin | G01S 19/44 |
| 10,330,795 B2* | 6/2019 | Di Federico | G01S 19/072 |
| 10,605,926 B2* | 3/2020 | Lie | G01S 19/43 |
| 10,627,528 B2* | 4/2020 | Lie | G01S 19/43 |
| 2012/0306694 A1 | 12/2012 | Chen et al. | |
| 2014/0002300 A1 | 1/2014 | Leandro et al. | |
| 2015/0293233 A1 | 10/2015 | De Jong | |
| 2016/0077214 A1* | 3/2016 | Xianglin | G01S 19/24 |
| | | | 342/357.27 |
| 2017/0031032 A1* | 2/2017 | Garin | G01S 19/55 |
| 2017/0176989 A1 | 6/2017 | Hay et al. | |
| 2017/0269231 A1* | 9/2017 | Dai | G01S 19/32 |

(Continued)

*Primary Examiner* — Erin F Heard
*Assistant Examiner* — Michael W Justice
(74) *Attorney, Agent, or Firm* — Osha Bergman Watanabe & Burton LLP (57) ABSTRACT

A method for determining positions of a mobile system is disclosed. The method involves receiving, by a receiver of the mobile system, a first set of correction data which is broadcasted from a first transmitter, wherein the first set of correction data comprises Differential Global Navigation Satellite System (D-GNSS) correction data, estimating, using a real-time kinematics (RTK) method, a first position of the mobile system using at least a portion of the first set of correction data, estimating one or more unknown parameters of a precise point positioning (PPP) estimation method based at least on the estimated first position of the mobile system and the first set of correction data, and estimating a second position of the mobile system using the estimated one or more parameters and the PPP estimation method, wherein the second position of the mobile system is different from the first position of the mobile system.

20 Claims, 5 Drawing Sheets

(56) References Cited

U.S. PATENT DOCUMENTS

| | | | |
|---|---|---|---|
| 2017/0299730 A1* | 10/2017 | Lie | G01S 19/43 |
| 2018/0095177 A1* | 4/2018 | Peake | G01S 19/07 |
| 2018/0210089 A1* | 7/2018 | Wang | G01S 19/04 |
| 2018/0210091 A1* | 7/2018 | Di Federico | G01S 19/32 |
| 2020/0064486 A1* | 2/2020 | Fujita | G01S 19/08 |

* cited by examiner

BROADCAST AND UTILIZATION OF PRECISE GNSS CORRECTION DATA

BACKGROUND

Global Navigation Satellite System (GNSS, also commonly called GPS) position data is often only precise to within 2-5 meters. Consequently, GNSS data, while invaluable in many settings, lacks the requisite precision to be utilized in applications needing more precise position data. Accordingly, methods for determining more precise position data are desired.

Various technologies have developed that reduce error in GNSS position data and thereby provide a more precise position. Two of these methods are Precise Point Positioning (PPP) and Real Time Kinematics (RTK), both of which solve for and reduce errors in the variables used to calculate GNSS position data. There is still need in the art to increase accuracy of position determination methods.

SUMMARY

In general, in one aspect, the invention relates to a method for determining position of a mobile system comprising receiving, by a receiver of the mobile system, a first set of correction data which is broadcasted from a first transmitter, wherein the first set of correction data comprises Differential Global Navigation Satellite System (D-GNSS) correction data, estimating, using a real-time kinematics (RTK) method, a first position of the mobile system using at least a portion of the first set of correction data, estimating one or more unknown parameters of a precise point positioning (PPP) estimation method based at least on the estimated first position of the mobile system and the first set of correction data, and estimating a second position of the mobile system using the estimated one or more parameters and the PPP estimation method, wherein the second position of the mobile system is different from the first position of the mobile system.

In general, in one aspect, the invention relates to a mobile system comprising a receiver configured to receive a first set of correction data, which is broadcasted from a first transmitter, wherein the first set of correction data comprises D-GNSS correction data, wherein the mobile system is configured to estimate, using a RTK method, a first position of the mobile system using at least a portion of the first set of correction data, estimate one or more unknown parameters of a PPP estimation method based at least on the estimated first position of the mobile system and the first set of correction data, and estimate a second position of the mobile system using the estimated one or more parameters and the PPP estimation method, wherein the second position of the mobile system is different from the first position of the mobile system.

In general, in one aspect, the invention relates to a non-transitory computer readable medium comprising program instructions that, when executed by a processor, perform a method for determining position of a mobile system comprising receiving, by a receiver of the mobile system, a first set of correction data which is broadcasted from a first transmitter, wherein the first set of correction data comprises D-GNSS correction data, estimating, using a RTK method, a first position of the mobile system using at least a portion of the first set of correction data, estimating one or more unknown parameters of a PPP estimation method based at least on the estimated first position of the mobile system and the first set of correction data, and estimating a second position of the mobile system using the estimated one or more parameters and the PPP estimation method, wherein the second position of the mobile system is different from the first position of the mobile system.

Other aspects and advantages of the invention will be apparent from the following description and the appended claims.

DETAILED DESCRIPTION

Specific embodiments will now be described in detail with reference to the accompanying figures. Like elements in the various figures are denoted by like reference numerals for consistency. Like elements may not be labeled in all figures for the sake of simplicity.

In the following detailed description, numerous specific details are set forth in order to provide a more thorough understanding of one or more embodiments of the invention. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element or noun in the application. The use of ordinal numbers is not to imply or create a particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a horizontal beam" includes reference to one or more of such beams.

Terms like "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In general, embodiments disclosed herein relate to a method for determining a position of a mobile system. Specifically, embodiments disclosed herein apply carrier-phase based techniques to standard GNSS data to provide more precise position data for a mobile system. The mobile system may be any object for which a precise position may be desired, such as for example, a vehicle, a smart phone, a tablet, a drone, a person/animal, or any other suitable mobile object.

There are two main carrier-phase based techniques to achieve such precision. These techniques are Real Time Kinematic (RTK) and Precise Point Positioning (PPP). In both systems, carrier phase measurements, usually together with code phase measurements, are utilized to precisely calculate actual time of flight of GNSS signals and therefore determine more precise time and position information.

At a given time "t" and for a given satellite "i", simplified observation equations for code phase (also called pseudorange) and carrier phase measurements are as follows:

$$\varphi(i, t) = \qquad \text{(Eq. 1)}$$
$$(\rho(i, t) - e_{iono}(i, t) + e_{tropo}(i, t) + c \times (e_{clock}^{recv}(t) - e_{clock}^{sat}(i, t)) -$$
$$N(i, t) \times \lambda)/\lambda \times 2\pi + \varepsilon_\varphi(i, t)$$
$$p(i, t) = \rho(i, t) - e_{iono}(i, t) + e_{tropo}(i, t) +$$
$$c \times (e_{clock}^{recv}(t) - e_{clock}^{sat}(i, t)) + \varepsilon_P(i, t)$$

Where,
$\varphi$, is the carrier phase measurement in radians,
p, is the pseudorange measurement in meters,
$\rho$, is the geometrical distance between the satellite and the receiver in meters,
$e_{iono}$, is the signal path delay error due to the space ionosphere in meters,
$e_{tropo}$, is the signal path delay error due to the space troposphere in meters,
$e_{clock}^{recv}$, is the receiver clock offset from the reference (GPS) time in seconds,
$e_{clock}^{sat}$, is the satellite clock offset from the reference (GPS) time in seconds,
c, is the speed of light in vacuum in meters per second,
$\lambda$, is the carrier nominal wavelength in meters,
N, is the ambiguity of the carrier-phase, as integer multiplier of wavelength,
$\varepsilon_\varphi$, are the carrier measurement noise components, including multipath and other effects in radians, and
$\varepsilon_P$, are the code measurement noise components, including multipath and other effects in meters.

The geometrical distance between satellite "i" and the receiver may be represented by equation below:

$$\rho(i, t) = \sqrt{\begin{array}{c}(x^{recv}(t) - x^{sat}(i, t))^2 + (y^{recv}(t) - y^{sat}(i, t))^2 + \\ (z^{recv}(t) - z^{sat}(i, t))^2\end{array}} \quad \text{(Eq. 2)}$$

$$x^{sat}(i, t) = x_{truth}^{sat}(i, t) + \varepsilon_{orbit}^x(i, t)$$
$$y^{sat}(i, t) = y_{truth}^{sat}(i, t) + \varepsilon_{orbit}^y(i, t)$$
$$z^{sat}(i, t) = z_{truth}^{sat}(i, t) + \varepsilon_{orbit}^z(i, t)$$

Where,
$x^{recv}$, is X coordinate of the receiver's position, similarly for Y and Z axes,
$x^{sat}$, is X coordinate of the satellite's position, calculated using satellite's navigation model (also called ephemeris), similarly for Y and Z axes,
$x_{truth}^{sat}$, is true X coordinate of the satellite position, similarly for Y and Z axes, and
$\varepsilon_{orbit}^x$, is the orbit error along X axis, similarly for Y and Z axes.

As used in the equations above, multipath propagation results in GNSS signals reaching the receiving antenna by two or more paths. However, in the absence of multipath, major error sources impacting precision of GNSS satellites are (1) Satellite clock bias, (2) Satellite orbital error, (3) Ionosphere path delay, (4) Troposphere path delay, (5) Satellite clock error, and (6) Receiver clock error.

Variations in most of the above-mentioned errors are minimal within approximately 10 km of a reference location, and hence they cancel out when differential processing is applied. As an example, differential processing removes the error in the satellite clock bias, the satellite orbital error, the ionospheric delay, and the tropospheric delay. The errors remaining after correction would therefore be multipath, interference, and receiver thermal noise. Of the errors listed above, the only one which is truly constant with respect to the user location is the satellite clock bias; the rest will show a given dependency with the location as the receiver moves away from the reference location. The tropospheric error is the first to be fully de-correlated after only a few kilometers.

Carrier measurement noise is usually much smaller than the code pseudorange measurement noise. The typical error of code pseudorange measurements is around 1 meter, however, carrier phase measurement error is approximately few millimeters. It should be noted that processing of carrier measurements is subject to the carrier phase ambiguity (the unknown integer multiplier of the carrier wave length) that needs to be estimated to rebuild full range measurements from carrier measurements.

The carrier phase ambiguity may be estimated using differential measurements between the receiver and one or more nearby reference stations. A reference station is normally stationary and setup at a location with open view of sky. It consists of at the minimum a GNSS receiver that estimates raw or processed code phase and carrier phase measurements for the GNSS satellites that it observes. The data, often called correction data, that the reference station estimated may be transmitted to a backend server for aggregation, further processing, and distribution to users.

There are different techniques available to estimate the carrier phase ambiguity, some based on single frequency measurements with long convergence times, and others that take advantage of dual frequency observables with shorter convergence. In general, the techniques either depend on a high precision knowledge and estimation of the errors listed in Eq. (1), or assumption that the receiver and a reference station are close enough so that the error differential is negligible when compared with the wave-length of the carriers (around 20 cm). The latter method is the approach followed in RTK, limiting the service area to 10 or 20 km; the former method is used in PPP-based methods (also called assisted PPP, PPPRTK, enhanced PPP, etc.) to cover large service areas with reference stations separated by, e.g., hundreds of kilometers. In embodiments disclosed herein, the term Differential GNSS (D-GNSS) is used broadly to cover both RTK and PPP GNSS receivers. The term "D-GNSS correction data" refers to the correction data for code phase and carrier phase GNSS, including RTK, PPP, or any combination thereof.

For the RTK system to be practical for specific mobile system applications, such as for example automotive applications, there needs to be a network of reference stations that cover a range through which the vehicle moves, such that the RTK GNSS receiver on the vehicle periodically (e.g., every second) receives relevant RTK correction data. Specifically, RTK requires a reference station within 10-40 km distance from the mobile system to allow for differential processing. Furthermore, an overlap in transmitter broadcast areas provides for smooth transitions when traveling from one broadcast region to another. RTK convergence time is defined as the time taken for the receiver to determine its position with a predetermined accuracy. As an example, the RTK receiver may converge to 10 cm or better accuracy in less than 30 seconds.

In a PPP system, much fewer reference stations are needed compared to the RTK systems. On average, a PPP system may need a reference station every 100-300 km radius. However, in general, PPP suffers from long convergence time, in the order of tens of minutes. Without any reference station assistance, PPP method may take even longer (e.g., several hours) to converge. This delay is due to many unknowns that receiver has to estimate precisely (with centimeter level accuracy) together, these unknowns include error terms listed in Eq. (1), ambiguity of the carrier-phase, and receiver's position information.

One or more embodiments disclosed herein relate to the integration of I2V (Infrastructure-to-Vehicle) communications, RTK, and PPP. Using a combination of I2V communications, RTK, and PPP methods allows for more precise position determination suitable for higher precision applications. In one or more embodiments, a transmitter downloads D-GNSS correction data from a server. Alternatively, the transmitter may derive the data itself using a built-in or add-on D-GNSS receiver.

In one embodiment, the transmitter broadcasts RTK and PPP correction data to a range of, for example, 300 to 1000 meters. Those skilled in the art will appreciate that the range of broadcast by the transmitter may be larger or smaller than the above range without departing from the scope of the invention.

In PPP based methods, the estimator that estimates time and position information of the receiver must also estimate precise values of various errors in measurements. This process usually takes from several minutes to several hours to converge. Embodiments of the invention combine the PPP method with the RTK method so that convergence of PPP occurs more quickly.

The equation below illustrates an example state vector of a PPP based estimator, including the main unknowns:

$$\overline{X}(i,t)=[x^{recv}(t),y^{recv}(t),z^{recv}(t),N(1,t),N(2,t),\ldots,N(m,t),e_{iono}(1,t),e_{iono}(2,t),\ldots,e_{iono}(m,t),e_{tropo}(1,t),e_{tropo}(2,t),\ldots,e_{tropo}(m,t),\ldots]$$ (Eq. 3)

The main unknowns are: (1) receiver X, Y, Z positions, (2) carrier phase ambiguities, (3) satellite clock bias, (4) satellite orbital error, (5) ionosphere path delay (iono), and (6) troposphere path delay (tropo).

The equations below illustrate how the PPP convergence method may benefit from time and position information calculated by the RTK processing to estimate its unknowns and converge.

In Eq. (1) for estimation of φ(i,t), we denote all the errors with a new term, and rewrite Eq. (1) as follows:

$$e_{combo}(i,t)=-e_{iono}(i,t)+e_{tropo}(i,t)+c\times(e_{clock}^{recv}(t)-e_{clock}^{sat}(i,t))$$ (Eq. 4)

Combining Eqs. (1) and (4) results in:

$$\varphi(i,t)=(\rho(i,t)+e_{combo}(i,t)-N(i,t)\times\lambda)/\lambda\times 2\pi+\varepsilon_\varphi(i,t)$$ (Eq. 5)

All of the errors in "$e_{combo}$" in Eq. (4) do not change much in a predefined duration (e.g., within approximately 10 seconds). In the absence of multipath and ignoring measurement and other negligible remaining errors, it can be concluded that:

$$e_{combo}(i,t+\Delta t)\cong e_{combo}(i,t)$$ (Eq. 6)

$$d_\varphi(i,t+\Delta t)=\varphi(i,t+\Delta t)-\varphi(i,t)$$

$$d_\varphi(i,t+\Delta t)\cong(\rho(i,t+\Delta t)-\rho(i,t)-[N(i,t+\Delta t)-N(i,t)]\times\lambda)\times 2\pi$$ (Eq. 7)

Where, $$\Delta t \leq 10 \text{ seconds}$$ (Eq. 8)

$$\rho^2(i,t) = (x_{RTK}^{recv}(t)-x^{sat}(i,t))^2 + (y_{RTK}^{recv}(t)-y^{sat}(i,t))^2 + (z_{RTK}^{recv}(t)-z^{sat}(i,t))^2$$

$$\rho^2(i,t+\Delta t) = (x_{RTK}^{recv}(t+\Delta t)-x^{sat}(i,t+\Delta t))^2 + (y_{RTK}^{recv}(t+\Delta t)-y^{sat}(i,t+\Delta t))^2 + (z_{RTK}^{recv}(t+\Delta t)-z^{sat}(i,t+\Delta t))^2$$

$$N(i,t+\Delta t) = \text{integer}\left\{\frac{\rho(i,t+\Delta t)}{\rho(i,t)}N(i,t)\right\}$$

If x, y, z coordinates of satellite positions are precisely known, then one system of equations (7) for all satellites 1, 2, ..., n could be solved to find unknowns "N(i,t)". If satellite positions are not precisely known, then several measurements are taken at more time intervals to solve for all the unknowns:

$$\varepsilon_{orbit}^x(i,t+\Delta t)\cong\varepsilon_{orbit}^x(i,t)$$

$$\varepsilon_{orbit}^y(i,t+\Delta t)\cong\varepsilon_{orbit}^y(i,t)$$

$$\varepsilon_{orbit}^z(i,t+\Delta t)\cong\varepsilon_{orbit}^z(i,t)$$

Where,$\Delta t\leq 10$ seconds (Eq. 9)

As discussed below, in reference to the figures provided, these unknown variables are solved by using the various forms of correction data utilized in the methods of position correction.

Figure 1:
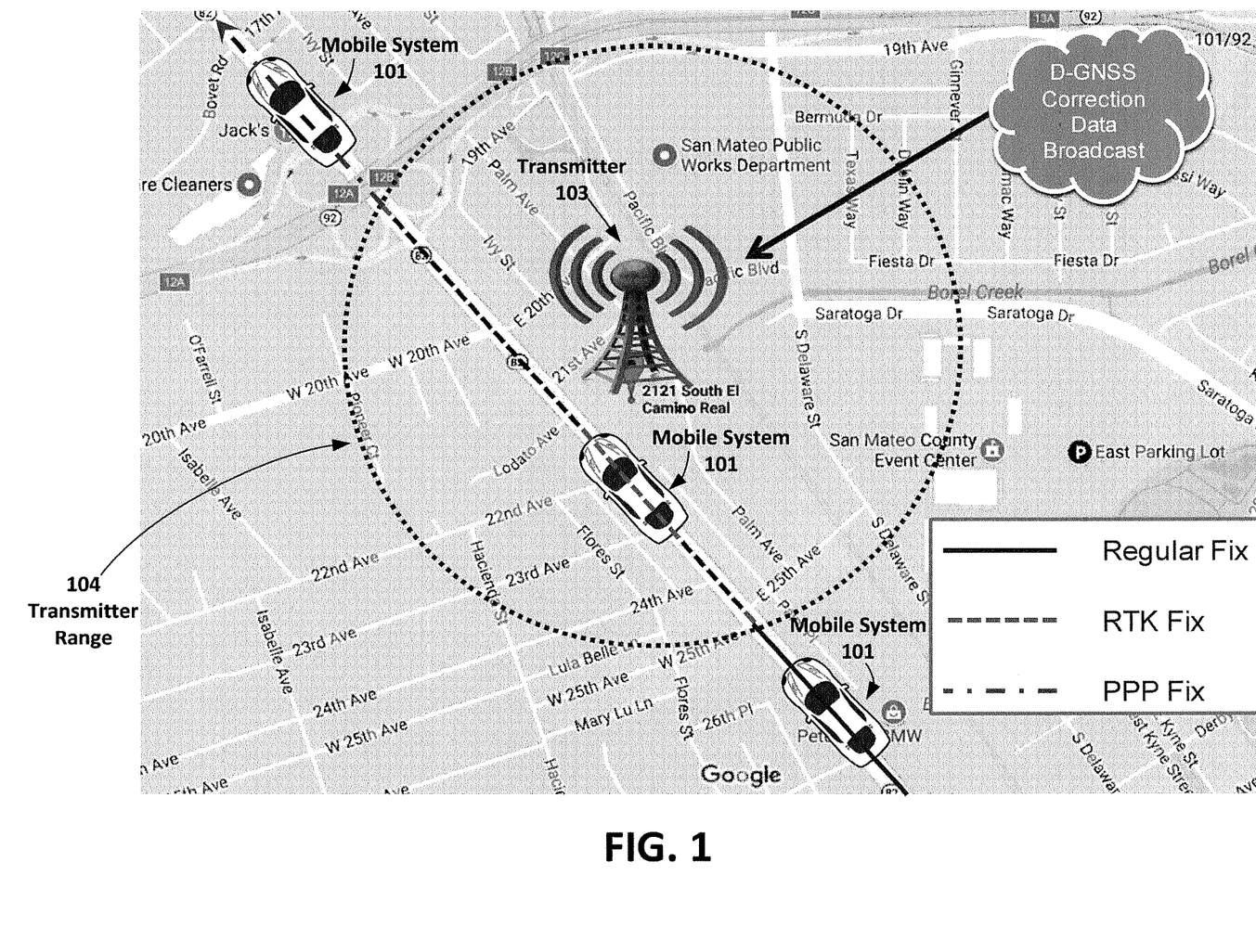
FIG. 1 shows the various possible positions of a mobile system as it moves into, through, and out of a transmitter range according to one or more embodiments of the invention.

FIG. 1 shows a diagram of a moving object (e.g., a mobile system), where the mobile system (101) is a vehicle. In the embodiment of FIG. 1, the mobile system (101) begins moving outside the range (104) of a transmitter (103), acquiring only standard GNSS position data (represented by the solid line). GNSS signals received by the mobile system (101) outside of the transmitter range (104) allow the vehicle's position to be determined to an accuracy of about 2-5 meters.

As described above, although FIG. 1 shows an automobile vehicle, the mobile system (101) may be any type of vehicle (e.g., boat, locomotive, airplane, helicopter), a smart phone, a tablet, a drone, a satellite, or any other type of suitable mobile system. In one example, the transmitter range (104) (represented by the area within the dotted circle in FIG. 1) may be approximately 300 meters. However, any other transmitting range may also be possible without departing from the teachings of the present disclosure.

Continuing with FIG. 1, the mobile system (101) proceeds into the transmitter range (104) (represented by the dotted circle). The transmitter (103) is configured to broadcast a first set of correction data that includes D-GNSS correction data. In one or more embodiments, the transmitter (103) may be a cellular base station. In alternative embodiments, the transmitter (103) may be an infrastructure unit such as a roadside unit (RSU) that broadcasts D-GNSS correction data using V2X (Vehicle to Everything) communication technology (e.g., dedicated short range communication (DSRC), Cellular V2X, etc.). In one example, the roadside unit may be on a light pole, traffic light, traffic sign (e.g., stop sign), bus stop, a building or any other place along a road. In one or more embodiments, the data is broadcast via wireless communications including one or more of the following: LTE-Direct, Cell Broadcast (CBC), LTE Multimedia Broadcast Multicast Services (MBMS), a current or future standard of wireless mobile telecommunications (e.g. 2G, 3G, 4G, 5G), or any other type of suitable wireless communications protocol. Those skilled in the art will appreciate that the transmitter (103) may be any wireless base station or any other suitable transmitter capable of broadcasting the correction data.

In one or more embodiments, the D-GNSS correction data may include a position of the transmitter (103), carrier phase measurements, code phase measurements, pseudorange measurements (raw or processed), signal to noise (SNR) ratio observations for GPS L1 and L2 frequencies, signal path delay error due to the ionosphere, signal path delay error due to the troposphere, receiver clock offset from reference GNSS time, satellite clock offset from GNSS time, satellite clock bias, satellite orbital error, code measurement noise components (e.g., multipath), carrier measurement noise components (e.g., multipath), or any other type of correction data.

In one or more embodiments, a first set of correction data broadcast by the transmitter (103) may provide sufficient data to allow for the RTK method of correcting GNSS data. For example, the first set of correction data may be broadcast data that is broadcast by a transmitter and includes D-GNSS correction data (e.g., RTK correction data, PPP correction data, or a combination thereof). The first set of correction data broadcast by the transmitter (103) may also provide sufficient data to allow for the PPP method of correcting GNSS data.

In one embodiment, a receiver in the mobile system (101), e.g., a GNSS receiver located in a vehicle-to-infrastructure (V2I) unit in the vehicle, may be configured to receive the D-GNSS correction data broadcast by the transmitter (103). Using the RTK method, the receiver estimates a first position of the mobile system (101) using at least a portion of the first set of correction data, to obtain an estimated first position of the mobile system. For example, the estimated first position may be an initial location of the mobile system determined to a particular level of accuracy based on the D-GNSS correction data broadcast by the transmitter. Therefore, when the mobile system (101) is in the transmitter range (104), position data is continuously calculated using the broadcasted RTK correction data, thereby providing more precise position data than standard GNSS position data available outside of the transmitter range (104).

In one or more embodiments, while in the transmitter range (104), the mobile system (101) is also capable of estimating one or more of the unknown parameters (e.g., phase ambiguity of a carrier signal, etc.) needed for PPP correction using, at least, the estimated first position of the mobile system (101) and the first set of correction data.

Continuing with FIG. 1, when the mobile system (101) leaves the transmitter range (104), thereby losing access to the RTK correction data broadcast by the transmitter (103), the GNSS receiver of the mobile system is able to utilize the estimated parameters of the PPP correction data (represented by the dotted and dashed line outside of transmitter range (104) to estimate a second position of the mobile system (101). Because the mobile system (101) is moving continuously, the estimated second position of the mobile system (101) will be different than that of the estimated first position. Those skilled in the art will appreciate that when multiple transmitters are placed within overlapping ranges of each other, or when the mobile system (101) moves from one transmitter range to another transmitter range even after a short gap in between, RTK correction data and/or PPP correction data may be used again to estimate and more precisely determine a second position of the mobile system, as the mobile system continues moving.

Figure 2:
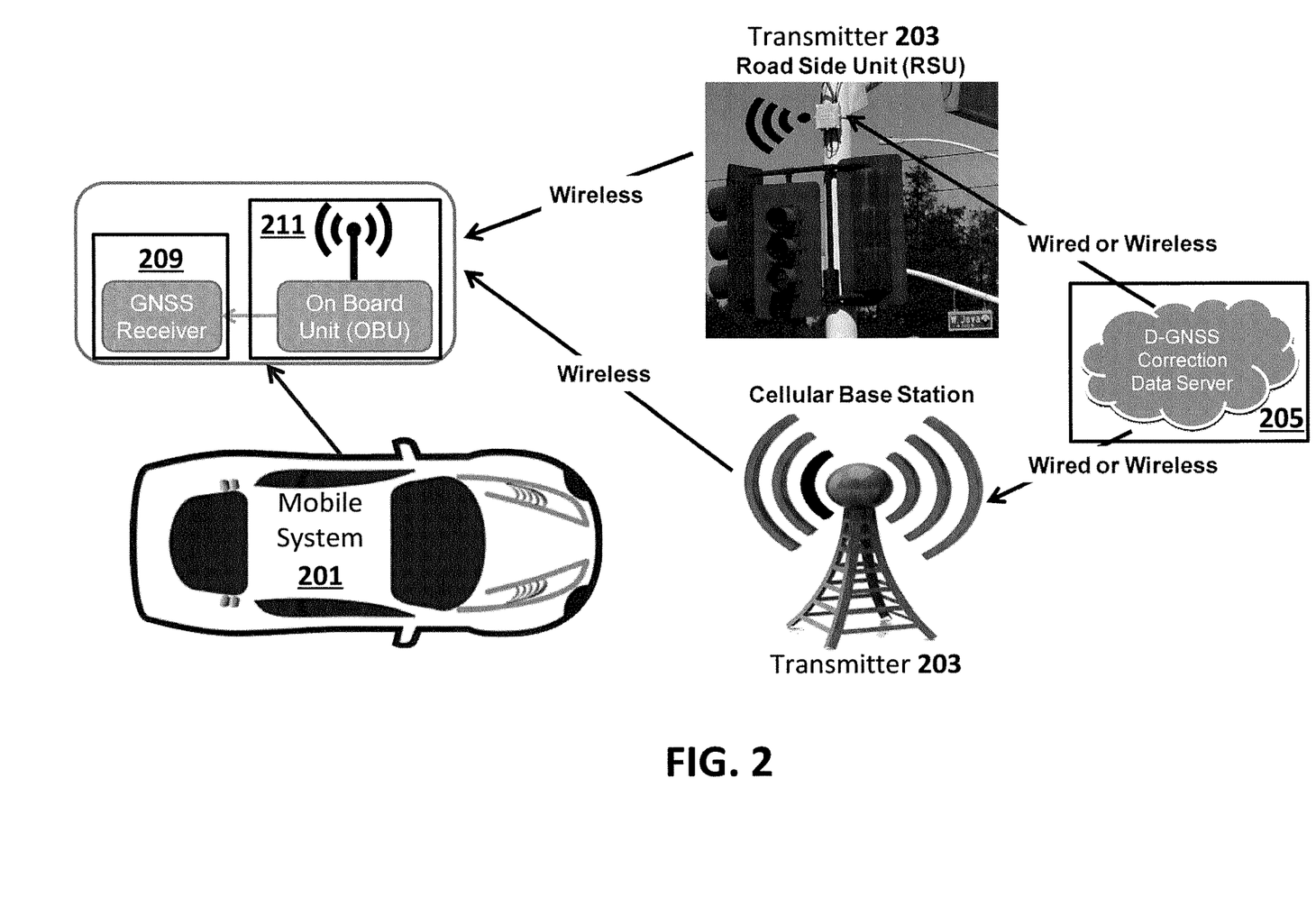
FIG. 2 shows a high level architecture for determining a position of a mobile system according to one or more embodiments of the invention.

FIG. 2 shows a high level architecture for determining a position of a mobile system in accordance with one or more embodiments disclosed herein. In one or more embodiments, the architecture includes a mobile system (201), a transmitter (203), and a D-GNSS correction data server (205). In FIG. 2, the mobile system (201) is a vehicle equipped with an On-Board Unit (OBU) (211) and GNSS receiver (209). In one or more embodiments, the OBU (211) and receiver (209) may be part of a V2I unit mounted in the vehicle. Those skilled in the art will appreciate that components of the architecture shown in FIG. 2 also described above with respect to FIG. 1 (e.g., mobile system, transmitter) are the same, and are not described again for purposes of readability.

In one or more embodiments, the correction data broadcast by the transmitter (203) originates on a D-GNSS Correction Data Server (205). Specifically, the D-GNSS Correction Data Server (205) receives raw code and phase measurements from RTK reference stations (base stations) for storage and distribution. In one embodiment, the server may also be located next to or embedded in the RTK reference station. Accordingly, the server (205) may be any device capable of storing D-GNSS correction data. The server (205) may be located remotely and/or may be a distributed server across multiple nodes of a network. The server (205) sends correction data to the transmitter (203) through any means of suitable communication, e.g., over a wireless network using a wireless protocol or a wired network. In one example, the server (205) may communicate D-GNSS correction data to the transmitter (203) via a cellular network.

As described above, the transmitter (203) may be a cellular tower or a roadside unit (RSU) configured to download the D-GNSS correction data from the server (205). In addition, the transmitter (203) may be any suitable transmission device capable of broadcasting D-GNSS correction data. In one example, the broadcast may be within a range of 300 m-1000 m. The transmitter (203) may communicate and/or broadcast via DSRC or any other wireless communications protocol.

Continuing with the architecture of FIG. 2, an electronic control unit (ECU) (not shown) may be mounted inside or on the mobile system (201). For example, the ECU may be a V2I unit. The ECU may include a GNSS receiver (209) and a DSRC on-board unit (OBU) (211). In one or more embodiments, the OBU (211) may be configured to listen to infrastructure messages broadcasted by the transmitter (203), via one or more antennas, and download these messages. The messages may then be parsed by the OBU (211) for D-GNSS correction data (e.g., RTK correction data and/or PPP correction data). The OBU (211) is also configured to send the parsed D-GNSS correction data to the GNSS receiver (209).

The GNSS receiver (209) receives and consumes the parsed RTK/PPP correction data from the OBU (211) during the time that vehicle is receiving D-GNSS correction data via broadcast. The GNSS receiver (209) is configured to process the RTK/PPP correction data to estimate a position of the mobile system (201) (discussed further in FIG. 3 below).

Those skilled in the art will appreciate that although the above describes the OBU as being the component of the ECU that receives the broadcasted D-GNSS correction data, the GNSS receiver may directly receive the broadcasted D-GNSS correction data from the transmitter without departing from the scope of the invention. In an alternate embodiment, the GNSS receive may receive broadcasted D-GNSS correction data when the broadcast is transmitted by a cellular tower, and the DSRC OBU may receive broadcasted D-GNSS correction data when the broadcast is transmitted by a RSU transmitter.

Figure 3:
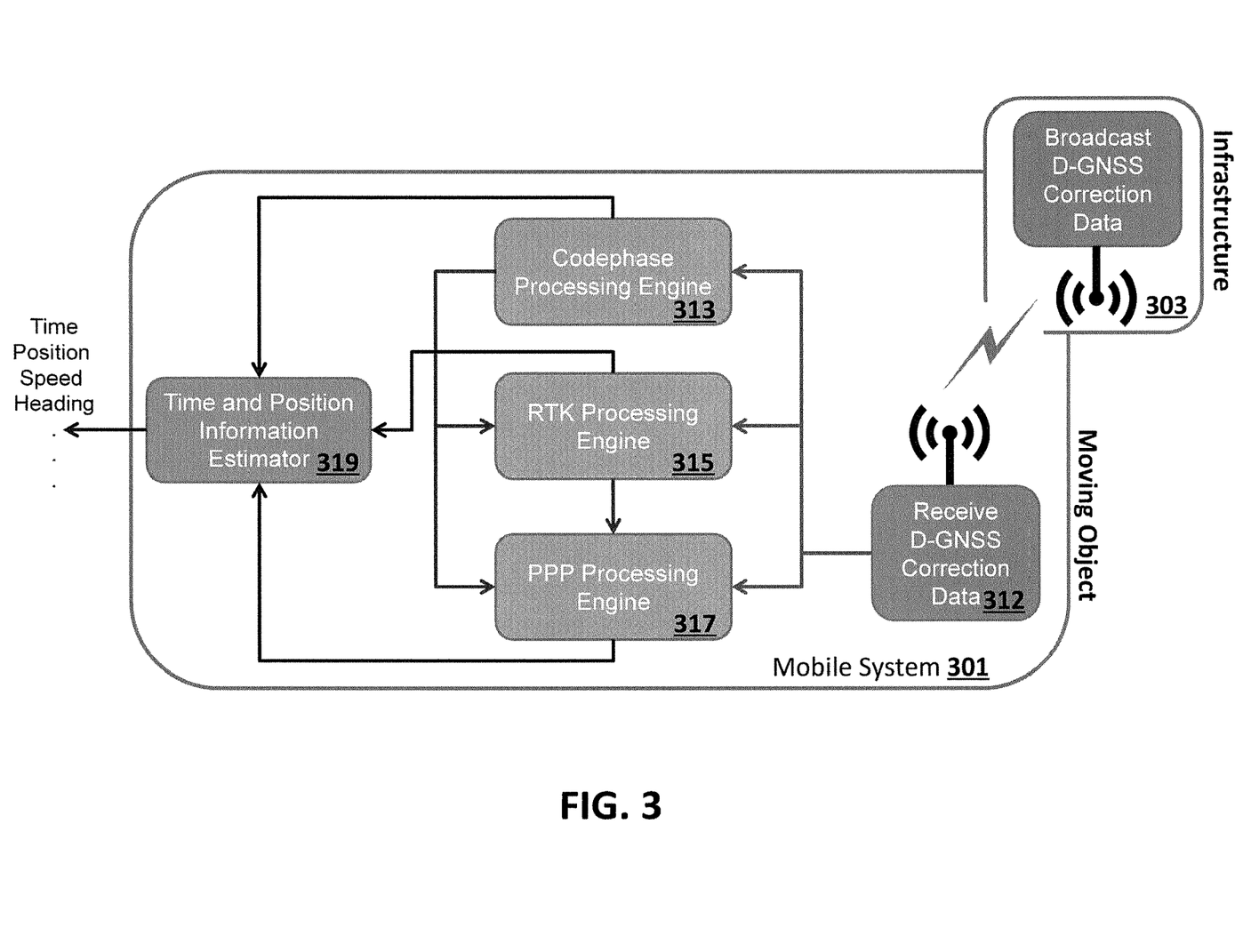
FIG. 3 shows a detailed architecture of internal processes of a mobile system according to one or more embodiments of the invention.

FIG. 3 shows a detailed architecture of internal processes of a mobile system (301). As shown, the mobile system (301) receives a set of D-GNSS correction data (312) broadcast by a transmitter (303).

In one or more embodiments, the ECU of the mobile system (301) (and more specifically, the GNSS receiver within the ECU) may include different processing engines to process the received D-GNSS correction data. Specifically, FIG. 3 shows a standard Codephase Processing Engine (313), an RTK Processing Engine (315), and a PPP Processing Engine (317). However, one of ordinary skill in the art would appreciate that the particular structure shown in FIG. 3 is merely one of many possible ways in which to organize the mobile system (301) structure.

The Codephase Processing Engine (313) of the mobile system (301) is capable of calculating time and position information even in the absence of D-GNSS correction data (e.g., when no RTK or PPP correction data is available yet, or if the corresponding processing engines (315, 317) have not converged yet). Thus, the Time and Position Information Estimator (319) is able to continuously receive and output some data, regardless of the availability of RTK and PPP correction data. Furthermore, the Codephase Processing Engine (313) provides the position and time information to the RTK and PPP Processing Engines (315, 317).

When the mobile system (301) is receiving D-GNSS correction data, specifically data that is utilized for the RTK method, the receiver sends the information to the RTK Processing Engine (315). Because the RTK Processing Engine (315) is receiving standard position and time data from the Codephase Processing Engine (313), the correction data may be processed in the RTK Processing Engine (315) to produce precise position data and then output that precise position data to the Time and Position Information Estimator (319).

Furthermore, the RTK precise position data is outputted from the RTK Processing Engine (315) and into the PPP Processing Engine (317) so that unknown parameters of the PPP corrections data may be determined faster to speed up the PPP convergence process.

Similarly, when the mobile system (301) is receiving PPP correction data, the receiver sends the correction data to the PPP Processing Engine (317). Furthermore, the PPP Processing Engine (317) is also receiving the RTK precise position data in addition to the standard position and time information from the Codephase Processing Engine (313). Thus, the PPP Processing Engine (317) calculates corrected position data using all three streams of data (standard position and time from the Codephase Processing Engine (313), unknown parameters determined by the RTK Processing Engine (315), and PPP correction data received by the receiver).

However, if the RTK correction data is no longer available (e.g., the mobile system (301) is no longer in range of a transmitter (303) broadcasting RTK specific D-GNSS correction data), the PPP Processing Engine (317) is still capable of calculating more precise position data using the unknown parameters from the RTK Processing Engine (315). Because the common errors in GNSS data remain relatively constant, the PPP Processing Engine (317) may assume the corrections for those errors to be constant and therefore still provide accurate correction data. More specifically, since the error terms in equation 3 above do not change very fast, PPP processing engine may assume them constant during at least about 10 seconds or longer.

The Time and Position Information Estimator (319), into which all Processing Engines input their data, combines (e.g., fuses) the position and time data from each of the processing engines such that a single, most accurate and precise position and time is obtained by the mobile system (301).

Figure 4:
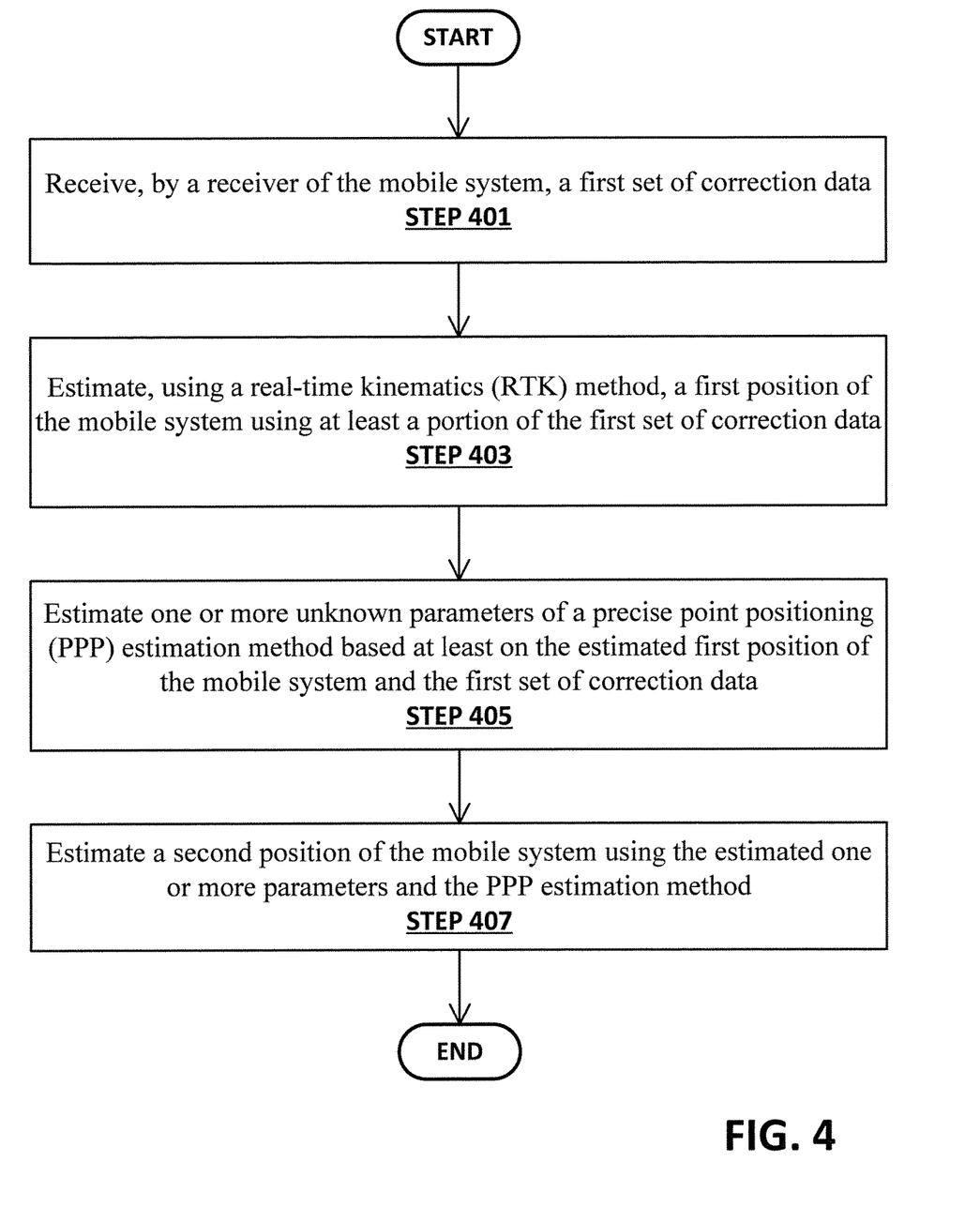
FIG. 4 shows a flowchart describing a method for determining a position of a mobile system according to one or more embodiments of the invention.

FIG. 4 shows a method for determining the position of a mobile system. While the various steps in FIG. 4 are presented and described sequentially, one of ordinary skill in the art will appreciate that some or all of the steps may be executed in different orders, may be combined or omitted, and some or all of the steps may be executed in parallel.

In STEP 401, the receiver of the mobile system receives a first set of correction data. The first set of correction data may be received by a GNSS receiver mounted inside or onto the mobile system. As described above, the first set of correction data may be RTK correction data broadcast by a cellular base station or a RSU as infrastructure messages. The mobile system listens for and downloads the infrastructure messages, and subsequently parses the infrastructure messages to obtain the first set of correction data.

In STEP 403, a first position of the mobile system is estimated using a Real Time Kinematic (RTK) method. The RTK method uses at least a portion of the first set of correction data. In one embodiment, a RTK processing engine of the GNSS receiver utilizes RTK correction data and calculates precise time and position information to estimate a first position of the mobile system.

In STEP 405, unknown parameters of a Precise Point Positioning (PPP) method are estimated using, at least, the estimated first position of the mobile system obtained in STEP 403, and the first set of correction data. In one embodiment, the GNSS receiver feeds the calculated time and position information from the RTK processing engine into a PPP processing engine of the GNSS receiver. The PPP processing engine utilizes PPP correction data and precise time and position information from the RTK engine as input, at one or multiple time stamps and positions, to estimate remaining unknowns of its estimator, including phase ambiguity.

In STEP 407, a second position of the mobile system is estimated using the one or more parameters of the PPP method for position estimation obtained in STEP 405. The second position is different from the first estimated position, and is obtained by fusing the time and position estimates of all the GNSS receiver processing engines. In one embodiment, the second position estimate has higher accuracy than the first position estimate.

Figure 5:
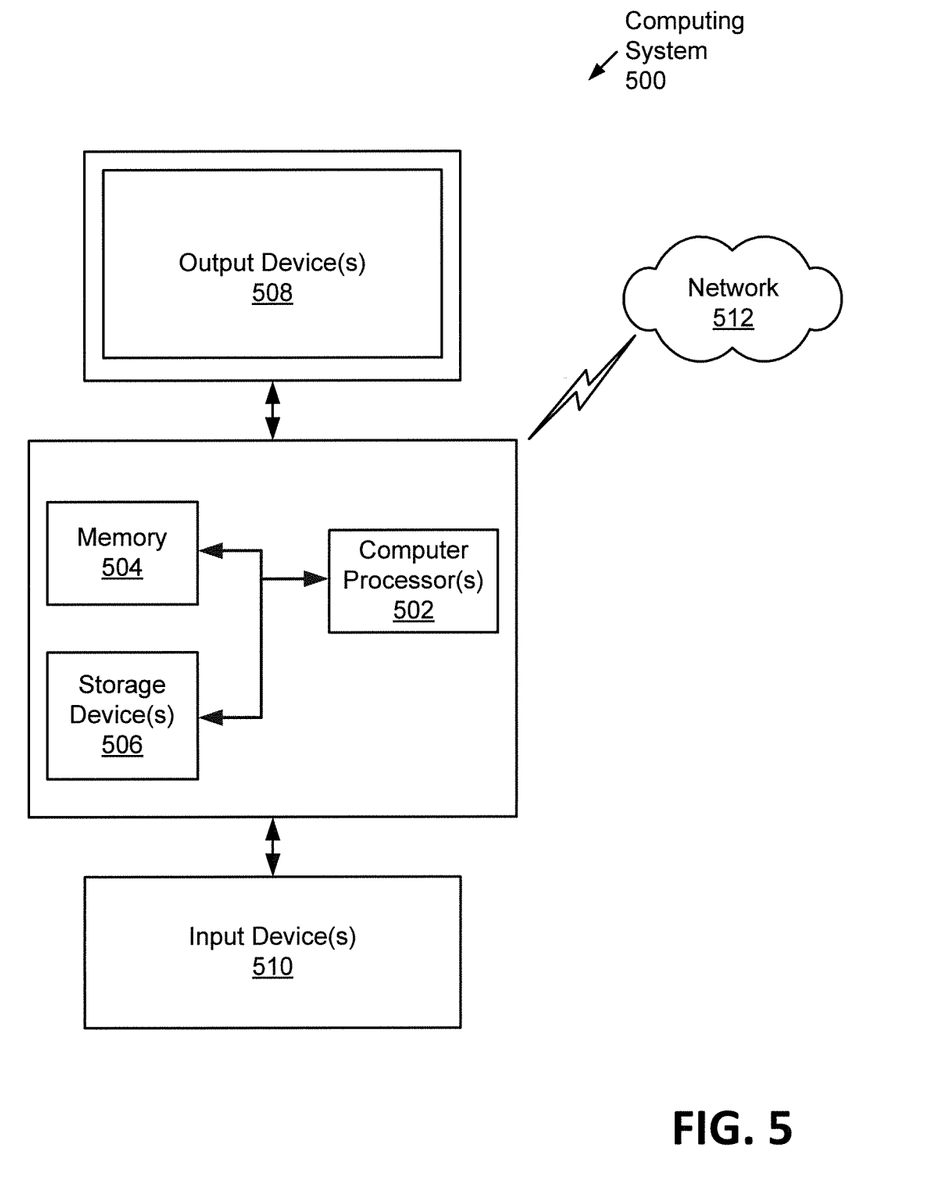
FIG. 5 shows a computing system for implementing the method of FIG. 4 in accordance with one or more embodiments of the invention.

Embodiments of the invention may be implemented on virtually any type of computing system, regardless of the platform being used. For example, the mobile system discussed in embodiments herein may be implemented as a computing system as shown in FIG. 5 or include one or more computing systems. Such a computing system may be one or more mobile devices (e.g., laptop computer, smart phone, personal digital assistant, tablet computer, or other mobile device), desktop computers, servers, blades in a server chassis, one or more ECUs in a vehicle or any other type of computing device or devices that includes at least the minimum processing power, memory, and input and output device(s) to perform one or more embodiments of the invention. For example, as shown in FIG. 5, the computing system (500) may include one or more computer processor (s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor (s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and be connected to the other elements over a network (512). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Embodiments disclosed herein provide precise mobile system positioning that may be required for active safety and automated applications, such as autonomous driving applications. Specifically, embodiments of the invention integrate infrastructure to vehicle communications, RTK, and PPP, for more precise position estimation of a mobile system. The architecture disclosed in embodiments herein provide base stations for downloading and calculating D-GNSS correction data, including RTK and PPP correction data. The D-GNSS correction data is broadcasted, either directly from base stations, or from nearby infrastructures that receives data from the D-GNSS Correction Data Server, to the vehicle's ECU. The vehicle then processes the D-GNSS correction data first using the RTK method, and then feeds the RTK position estimation result into the PPP method, to estimate unknown errors in PPP method and be able to later determine a more accurate estimation of the position of the mobile system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining positions of a mobile system, comprising:
   receiving, by a GNSS receiver of the mobile system, a first set of correction data which is broadcasted from a first transmitter, wherein the first set of correction data comprises Differential Global Navigation Satellite System (D-GNSS) correction data;
   estimating, by a computer processor of the mobile system using a real-time kinematics (RTK) method, a first position of the mobile system using at least a portion of the first set of correction data;
   estimating, by the computer processor using a precise point positioning (PPP) estimation method, one or more unknown parameters of the PPP estimation method based at least on the estimated first position of the mobile system and the first set of correction data;
   estimating, by the computer processor, a second position of the mobile system using the estimated one or more unknown parameters and the PPP estimation method, wherein the second position of the mobile system is different from the first position of the mobile system and is obtained by fusing time and position estimates of output from the RTK method and the PPP method; and
   outputting, by the computer processor, a combined position based on the first position and the second position.

2. The method of claim 1, wherein the one or more unknown parameters comprise phase ambiguity of a carrier signal.

3. The method of claim 1, wherein the first set of correction data is received by the first transmitter from a remote server prior to broadcast.

4. The method of claim 1, wherein the first transmitter comprises a cellular base station.

5. The method of claim 1, wherein the first transmitter comprises an infrastructure unit and the first set of correction data is transmitted using V2X (Vehicle to Everything) communication method.

6. The method of claim 1, wherein the first set of correction data comprises pseudorange and phase measurements for one or more GNSS satellites, determined by the GNSS receiver, and one or more atmospheric parameters for one or more GNSS satellites.

7. The method of claim 1, wherein accuracy of the estimated second position of the mobile system is higher than accuracy of the estimated first position of the mobile system.

8. The method of claim 1, wherein the mobile system is a vehicle.

9. A mobile system, comprising:
  a GNSS receiver configured to receive a first set of correction data, which is broadcasted from a first transmitter, wherein the first set of correction data comprises Differential Global Navigation Satellite System (D-GNSS) correction data; and
  a computing system comprising:
    a computer processor; and
    memory storing program instructions that, when executed, cause the computer processor to:
      estimate, using a real-time kinematics (RTK) method, a first position of the mobile system using at least a portion of the first set of correction data;
      estimate, using a precise point positioning (PPP) estimation method, one or more unknown parameters of the PPP estimation method based at least on the estimated first position of the mobile system and the first set of correction data;
      estimate a second position of the mobile system using the estimated one or more unknown parameters and the PPP estimation method, wherein the second position of the mobile system is different from the first position of the mobile system and is obtained by fusing time and position estimates of output from the RTK method and the PPP method; and
      output a combined position based on the first position and the second position.

10. The mobile system of claim 9, wherein the one or more unknown parameters comprise phase ambiguity of a carrier signal.

11. The mobile system of claim 9, wherein the first set of correction data is aggregated by a remote server and is received by the first transmitter from the remote server prior to broadcast.

12. The mobile system of claim 9, wherein the first transmitter is a cellular base station.

13. The mobile system of claim 9, wherein the first transmitter is an infrastructure unit and the first set of correction data is transmitted using V2X (Vehicle to Everything) communication method.

14. The mobile system of claim 9, wherein the first set of correction data comprises pseudorange and phase measurements for one or more GNSS satellites, determined by the GNSS receiver, and one or more atmospheric parameters for one or more GNSS satellites.

15. The mobile system of claim 9, wherein accuracy of the estimated second position of the mobile system is higher than accuracy of the estimated first position of the mobile system.

16. The mobile system of claim 9, wherein the mobile system is a vehicle and the GNSS receiver is mounted on the vehicle.

17. A non-transitory computer readable medium comprising program instructions that, when executed by a processor of a mobile system, perform a method for determining positions of the mobile system, comprising:
  receiving, by a GNSS receiver of the mobile system, a first set of correction data which is broadcasted from a first transmitter, wherein the first set of correction data comprises Differential Global Navigation Satellite System (D-GNSS) correction data;
  estimating, using a real-time kinematics (RTK) method, a first position of the mobile system using at least a portion of the first set of correction data;
  estimating, using a precise point positioning (PPP) estimation method, one or more unknown parameters of the PPP estimation method based at least on the estimated first position of the mobile system and the first set of correction data;
  estimating, a second position of the mobile system using the estimated one or more unknown parameters and the PPP estimation method, wherein the second position of the mobile system is different from the first position of the mobile system and is obtained by fusing time and position estimates of output from the RTK method and the PPP method; and
  outputting a combined position based on the first position and the second position.

18. The non-transitory computer readable medium of claim 17, wherein the one or more unknown parameters comprise phase ambiguity of a carrier signal.

19. The non-transitory computer readable medium of claim 17, wherein the first set of correction data is received by the first transmitter from a remote server prior to broadcast.

20. The non-transitory computer readable medium of claim 17, wherein the first transmitter comprises a cellular base station.

* * * * *